United States Patent [19]

Medford

[11] 4,055,709
[45] Oct. 25, 1977

[54] REJUVENATION OF NICKEL-CADMIUM BATTERY CELLS

[75] Inventor: Robert C. Medford, Newport News, Va.

[73] Assignee: The United States of America as represented by the Secretary of the Navy, Washington, D.C.

[21] Appl. No.: 712,105

[22] Filed: Aug. 5, 1976

[51] Int. Cl.² ........................................... H01M 10/44
[52] U.S. Cl. ...................................... 429/49; 204/2.1
[58] Field of Search .................. 429/48, 49; 320/3, 4; 204/2.1

[56] References Cited

U.S. PATENT DOCUMENTS 3,692,586  9/1972  Williams ........................ 204/2.1

FOREIGN PATENT DOCUMENTS 72 of       1914     United Kingdom .................... 429/49
1,256,980  12/1971   United Kingdom .................... 429/49

*Primary Examiner*—Donald L. Walton
*Attorney, Agent, or Firm*—Richard S. Sciascia; Thomas O. Watson, Jr.

[57] ABSTRACT

Nickel-Cadmium cells of insufficient voltage capacities are rejuvenated by a process which includes the steps of charging the cells, flushing the cells with demineralized water, replacing the electrolyte, and then deep discharging. The cells are left in the discharged state for shipping purposes and then charged prior to use.

6 Claims, No Drawings

REJUVENATION OF NICKEL-CADMIUM BATTERY CELLS

BACKGROUND OF THE INVENTION

This invention relates generally to batteries and more particularly to the rejuvenation of the cells of nickel-cadmium batteries.

Nickel-Cadmium battery cells are well known in the art and have been used as power sources in many applications. For example, Ni—Cd batteries have been used in the TALOS missiles for some years. In time, these batteries lose their electrical, i.e. voltage-current capacities due to contamination of the electrolyte with foreign substances and conversion of the potassium hydroxide (KOH) electrolyte to potassium carbonate ($K_2CO_3$) due to carbon dioxide ($CO_2$) absorption from the air. The specification for satisfactory battery cells for use in the TALOS missile (normally 1.25 volts) requires a voltage of at least 1.10 volts after discharging for 8 minutes at 55± 5 amperes. In the past, attempts to restore Ni—Cd cells to a condition which will pass the foregoing test were principally by electrical conditioning (charging) and replacement of electrolyte. These techniques achieved only very limited success and the cells which failed were discarded.

SUMMARY OF THE INVENTION

The present invention rejuvenates Ni—Cd cells which were previously discarded by a process which includes the steps of discharging the cells, charging the cells, flushing the cells with demineralized water in an ultrasonic bath, adding fresh electrolyte and then deep discharging. A second charging and deep discharging cycle frequently increases cell capacity further as does a third cycle.

DESCRIPTION OF THE PREFERRED EMBODIMENT

Cells to be rejuvented by the method of the present invention are first deep discharged by starting with a one ohm resistor and then charged at approximately 2.5 amperes for approximately 7 hours, or less time if equilibrium is obtained earlier. The old electrolyte is then drained and the cells thoroughly flushed internally with demineralized water in an ultrasonic bath to recondition the plates and remove any foreign substances. The step of charging the cells prior to the internal washing is essential since it was found that flushing the cells while in the discharged state was relatively ineffective in terms of reconditioning.

Fresh electrolyte is then prepared by dissolving 33% by weight of reagent grade potassium hydroxide in boiled, distilled water. The boiling of the distilled water removes any dissolved carbon dioxide. This new electrolyte is added to the cells and the cells are then discharged at 55± 5 amperes for 8 minutes. The cells are then deep discharged by shorting with a 1 ohm resistor. At this point, most of the cells which are capable of being rejuvenated are in a satisfactory and useable condition. However, it was found that a second and third charge and discharge cycle often provided further increases in electrical capacity.

EXPERIMENTAL RESULTS

Applicant ran a series of tests on 290 cells which were deemed defective and unsatisfactory for service use. Of these, 253 were rejuvenated successfully and only 37 needed to be scrapped. This represents a recovery rate of approximately 87%. The rejuvenated cells were found to have essentially the same electrical characteristics as when new. This, of course, does not imply that the cells have infinite life, but after reconditioning in accordance with the method of the present invention, the performance characteristics are unaffected until failure actually occurs due to physical damage or carbonate build-up.

Obviously many modifications and variations of the present invention are possible in the light of the above teachings. It is therefore to be understood that within the scope of the appended claims the invention may be practiced otherwise than as specifically described.

What is claimed is:

1. A method of rejuvenating nickel-cadmium battery cells of limited voltage capacity comprising the steps of:
   charging the cells at approximately 2.5 amps until equilibrium is reached;
   draining the electrolyte from the cells;
   flushing the cells internally with demineralized-distilled water, which is free of carbon dioxide, in an ultrasonic bath;
   preparing fresh electrolyte by dissolving approximately 33% by weight of reagent grade potassium hydroxide in boiled-distilled water; and
   adding said fresh electrolyte to said cells.

2. The method of claim 1 wherein each cell is deep discharged by shorting with a one ohm resistor prior to charging.

3. The method of claim 1 wherein the cells are prepared for shipment in the discharged state subsequent to the addition of fresh electrolyte by the steps of:
   discharging each cell at approximately 55 amperes for approximately 8 minutes; and
   shorting each cell with a one ohm resistor.

4. The method of claim 3 including the additional steps of:
   charging the cells at approximately 2.5 amperes until equilibrium is reached;
   discharging each cell again at approximately 55 amperes for approximately 8 minutes; and
   shorting each cell again with a one ohm resistor.

5. The method of claim 2 wherein the cells are prepared for shipment in the discharged state subsequent to the addition of fresh electrolyte by the steps of:
   discharging each cell at approximately 55 amperes for approximately 8 minutes; and
   shorting each cell with a one ohm resistor.

6. The method of claim 5 including the additional steps of:
   charging the cells at approximately 2.5 amperes until equilibrium is reached;
   discharging each cell again at approximately 55 amperes for approximately 8 minutes; and
   shorting each cell again with a one ohm resistor.

* * * * *